Jan. 22, 1935.     B. T. BROOKS     1,988,479
PROCESS FOR TREATING OLEFINES
Original Filed March 5, 1930
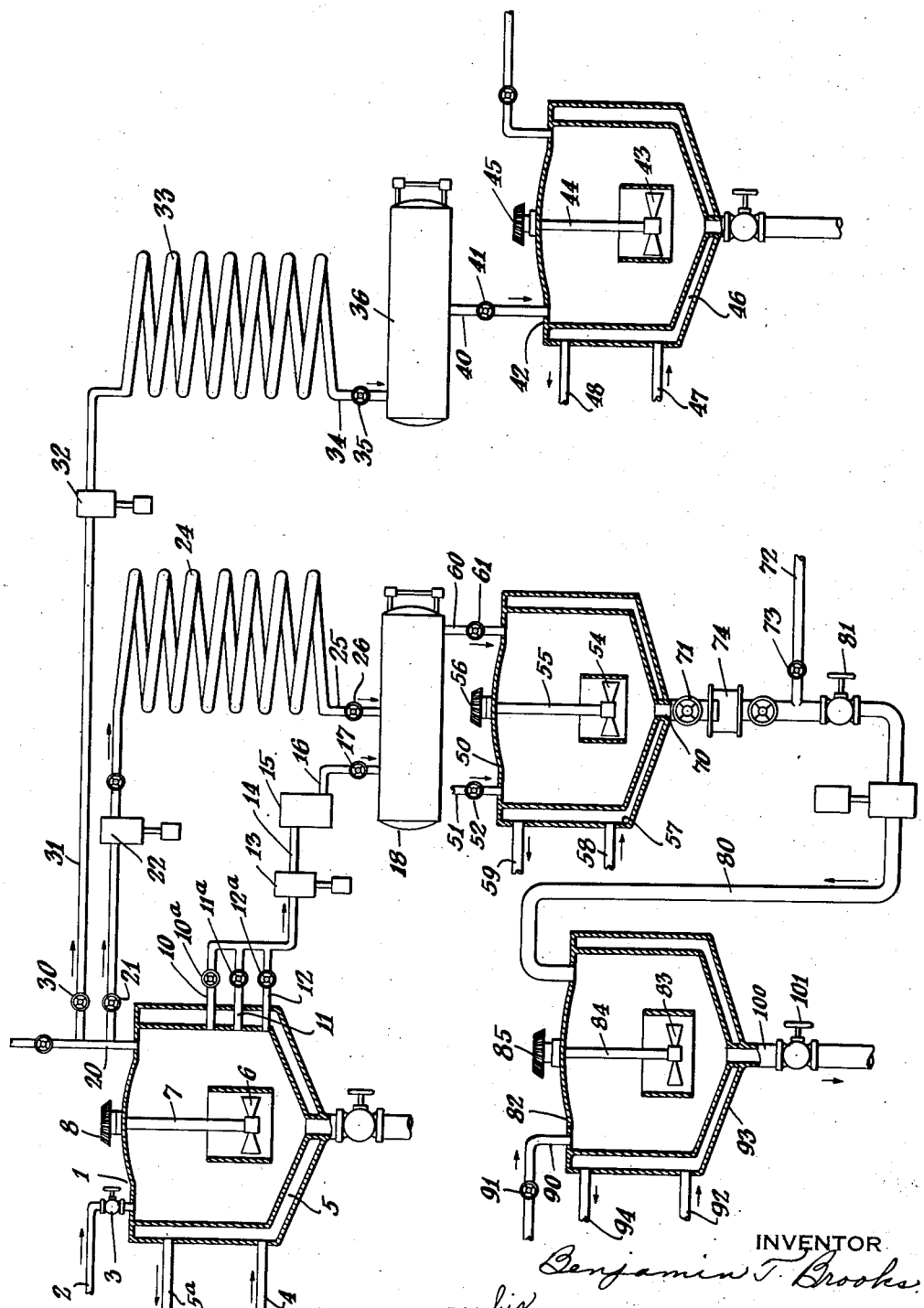
INVENTOR
Benjamin T. Brooks.
BY his ATTORNEY
Louis Burgess.

Patented Jan. 22, 1935

1,988,479

UNITED STATES PATENT OFFICE

1,988,479

PROCESS FOR TREATING OLEFINES

Benjamin T. Brooks, Greenwich, Conn., assignor, by mesne assignments, to Standard Alcohol Company, Wilmington, Del., a corporation of Delaware Original application March 5, 1930, Serial No. 433,426. Divided and this application June 30, 1931, Serial No. 547,897

24 Claims. (Cl. 260—6)

This application is a division of parent application, Serial No. 433,426, filed March 5, 1930.

This invention relates to the art of treating mixtures of olefines for the production therefrom of materials of greater value, and will be fully understood from the following description read in conjunction with the drawing which is a diagrammatic elevation with parts in section of apparatus in which my invention may be carried into effect.

Mono olefines and particularly mono olefines of not exceeding 6 carbon atoms occurring in mixtures of hydrocarbons produced by pyrolysis of organic materials such as bituminous coal, petroleum, etc.; have been converted into alkyl sulphates by reaction with sulphuric acid of concentration appropriate to the particular material treated. For example, the gases resulting from the manufacture of coke have heretofore been treated in absorption towers for the manufacture of butyl, propyl, and ethyl sulphates, and the ethyl sulphates so manufactured have been caused to yield ethyl ether.

The liquid mixtures of hydrocarbons containing olefines have been treated in liquid phase with sulphuric acid to generate mono alkyl sulphates, and the normally gaseous hydrocarbon mixtures obtained in oil cracking have been treated in absorption towers with aqueous sulphuric acid to generate mono alkyl sulphates which were thereafter decomposed by hydrolysis to yield corresponding alcohols. In all these cases, a certain amount of polymerization takes place concomitantly with the formation of the mono alkyl sulphates. When operating on mixtures of hydrocarbons containing olefines of different molecular weights, the concentration of acid employed is necessarily a compromise between the concentration which would be optimum for the individual components and automatically causes polymerization of the olefines of highest molecular weight. The diolefines present also take part in the polymerization.

I have found that this polymerization is not limited to olefines of higher molecular weight and/or to diolefines, but that such materials in polymerizing both chemically and physically seize upon the mono olefines for which the strength of sulphuric acid is appropriate, and thereby causes serious losses of valuable material together with corresponding diminished yields. To some extent the diolefines may be separated by a preliminary polymerization, but even in this case the particular mono olefines desired may be in part combined or dissolved in the polymers formed, and thereby lost to the process.

I have found that in these various cases the yield of mono alkyl sulphates may be very substantially enhanced by the preliminary selective removal without polymerization of the diolefines.

To a considerable extent the indiscriminate polymerization may be inhibited by a process which is in practical operation, and in which the mixtures of olefines are separated physically into groups consisting predominantly of hydrocarbons of a certain number of carbon atoms to the molecule. One such group may, for example, consist predominantly of hydrocarbons of 3 carbon atoms to the molecule. Another group may consist predominantly of hydrocarbons of 4 carbon atoms to the molecule, another group may consist predominantly of hydrocarbons of 5 carbon atoms to the molecule, and still another group may consist predominantly of hydrocarbons of six carbon atoms to the molecule. Such groups are preferably treated in liquid phase with solutions of sulphuric acid for the manufacture of the corresponding mono alkyl sulphates. While this method eliminates the indiscriminate polymerization resulting from olefines of higher molecular weight and permits the employment of sulphuric acid of a concentration which is optimum to the particular olefines to be converted, it does not permit of the recovery of all of the values present for the reason that diolefines are frequently present which polymerize concomitantly with the sulphation reaction, and as I have found, combine with the desired mono olefines. To some extent this situation may be benefited by an effort to selectively polymerize such diolefines prior to the final sulphation reaction, preferably followed by the physical removal of such polymers from the residual mono olefines by fractionation, etc. Even in this case I have found the diolefines steal substantial quantities of the desired mono olefines both chemically and physically, thereby preventing the attainment of the maximum efficiencies. It has been found possible, for example, by preparing such groups from the products of vapor phase cracking of petroleum to form raw materials which are exceptionally high in mono olefines and for that reason are highly favored raw materials. In this case, however, the proportion of diolefines is also substantial and the conversion of substantially all of the mono olefines has for this reason been heretofore impossible.

I have found, however, that by the selective preliminary removal without polymerization of the diolefines, practically all of the mono olefines are recoverable in the form of the corresponding alkyl sulphates. I have further found that this separation may be more economically and expeditiously effected by treating the said groups or fractions in liquid phase, although, of course, the separation may be effected in gas phase within the purview of my invention.

A number of methods are available for effecting this separation; for example, I may mix the said group or fraction of olefines of 4 carbon atoms to the molecule with benzo quinone, and hold the materials for a number of hours at temperatures of approximately 125° C. by which treatment the diolefine will be principally converted to tetra hydro naphthoquinone or its derivatives. The unconverted mono olefines may be separated from the latter compound by fractional distillation and then sulphated by any appropriate procedure.

Another feasible method is to mix such a group of olefines with mesityl oxide and to hold the materials at a temperature of 150° C. for a period of four hours, by which the diolefine present, viz, butadiene, will be principally converted into 1 acetyl—2—2 dimethyl cyclohexene 4. This compound is correspondingly separable from the mono olefines by fractional distillation. Another method for effecting this separation consists in admixing with the group mentioned maleic, ethyl, propyl, isopropyl or butyl esters which react with the butadiene to form tetrahydro phthalic esters. These latter compounds are separable from the mono olefines by fractionation.

A further method is to admix maleic acid or its anhydride with such a group of olefines and to heat the hydrocarbon material with the added maleic anhydride to about 100° C. for approximately four hours. This causes the maleic anhydride to react with the butadiene with the formation of tetra-hydro-phthalic anhydride. On cooling the mixture the compound formed becomes almost completely insoluble in the mono olefines and may be separated therefrom by decantation and/or filtration. When maleic esters are used the reaction products with butadiene are esters of tetra-hydrophthalic acid which are particularly valuable inasmuch as they may be prepared from relatively inexpensive raw material and are usable as such in admixture with other materials as a solvent for lacquers, etc. The tetra-hydrophthalic acid or its anhydride obtained as described, may be esterified with alcohols such as methyl, ethyl, propyl or isopropyl, the butyl and amyl alcohols and such esters are valuable as high boiling constituents of nitro cellulose or acetyl cellulose lacquers.

In my preferred method, however, I separate the diolefine content of the hydrocarbon material by a method whereby the diolefine may be regenerated and used as such. The diolefine is susceptible of valuable applications industrially, and this method makes available relatively large quantities of practically pure diolefine material of relatively great value. While I may separate the diolefines in this manner from mixtures of hydrocarbon containing mono and diolefines of various molecular weight, I preferably apply it to groups containing olefines of a certain number of carbon atoms to the molecule such as, for example, olefines of 4 or 5 carbon atoms to the molecule, and preferably apply it to mixtures consisting predominantly of olefines such as fractions obtained from the products of vapor phase cracking of petroleum oils. I may carry out this embodiment of the process, for example, by admixing a fraction consisting predominantly of olefines of a certain number of carbon atoms to the molecule, obtained from vapor phase cracking, with a material which forms a compound with the diolefines which compound is separable from the mono olefines and which when separated may be dissociated with regeneration of the diolefines.

I employ the term "dissociated" to indicate all various methods by which the said compound may be caused to yield the diolefine per se including, for example, the replacement of the diolefine by a third material; but I find it highly preferable to employ for this purpose a reagent which forms a compound with the diolefine, which compound is separable from the mono olefines and which compound may be dissociated by warming or heating with the consequent regeneration of the said reagent and the isolated diolefine. In this manner, I am enabled, by warming the material, to recover the diolefine and to then cool the recovered reagent and apply it to succeeding batches, thereby maintaining a cyclic process of great efficiency and economy.

Such an application of the invention will be illustrated in the following specific example:

The autoclave 1 is charged with a slurry of solid finely divided cuprous chloride in water or an aqueous solution. Such a solution may, for example, contain water and hydrochloric acid in the ratio of 10 to 25 parts thereof for every 100 parts of water present. I find, however, that a greater separation efficiency is achieved by employing a slurry of solid finely divided cuprous chloride in an aqueous solution containing a chloride of the type of ammonium chloride. Although a compound of hydrochloric acid with a substituted ammonia, viz., an amine, may be employed, I have obtained exceptionally favorable results with ordinary ammonium chloride. The ammonium chloride is preferably present in the ratio of from 5 to 20 parts thereof for every 100 parts of water present. The presence of an excess of solid cuprous chloride over that normally in solution maintains a maximum concentration of cuprous chloride in the solution during the reaction and thus facilitates the speed of reaction and efficiency of conversion. The quantity of cuprous chloride is, of course, regulated so that at least enough cuprous chloride is present to react with all the diolefine to be converted, and an excess thereof is desirable. I then charge through pipe 2, controlled by valve 3, the hydrocarbon material containing the diolefine. In this specific illustration, this hydrocarbon material is a fraction consisting predominantly of hydrocarbons containing 4 atoms to the molecule separated from the normally gaseous constituents, resulting from vapor phase cracking of petroleum oils carried out, for example, at temperatures between 1000 and 1200° F. Such a material may, for example, contain approximately the following percentages of the constituents enumerated:

| | Percent |
|---|---|
| Butadiene | 15–20 |
| Isobutene | 15–30 |
| Normal butene | 45–65 |

The autoclave is under pressure during this period, the pressure being the vapor pressure of the components present therein. The temperature of the materials in autoclave 1 is held relatively low, preferably below 10° C., by the admission of a refrigerating liquid such as ammonia, through pipe 4 to jacket 5. Any vaporized ammonia may return through 5ᵃ to the compression and cooling apparatus which constitutes a part of the usual refrigerating system. The materials in 1 are then thoroughly mixed by the operation of the mixing device comprising propeller 6, carried by shaft 7, and operated through bevel gear 8, by a driving mechanism which is not shown.

Under these conditions, the cuprous chloride forms a solid compound with the butadiene, whereas the mono olefines are not substantially affected, and in any event the said compound of cuprous chloride with butadiene is insoluble in water and in the balance of the hydrocarbon material and separable therefrom by decantation and/or filtration, centrifuging, etc.

The mixing is continued until the conversion of the diolefine is practically complete as may be determined by analyses, a period of one or two hours being ordinarily sufficient to insure complete reaction. The mixing device is then stopped and the mixture in autoclave 1 permitted to settle for a further period. The cuprous chloride butadiene compound settles out largely from the unconverted mono olefines and the bulk of the mono olefine may be separated by decantation. For this purpose, the supernatant mono olefine is abstracted by means of side outlets 10, 11 or 12, controlled respectively by valves 10$^a$, 11$^a$ and 12$^a$, and forced by means of pump 13, through pipe 14, and filter 15, into pipe 16, controlled by valve 17, to be received and stored in tank 18. The filter 15 separates any cuprous chloride butadiene compound which may be carried forward with the supernatant mono olefines. The separated compound may, of course, be returned continuously or periodically to autoclave 1. Some mono olefine material may remain in autoclave 1 as a result of imperfect separation or incomplete withdrawal. Such material, however, can be separated from the cuprous chloride butadiene compound by warming the contents of autoclave 1. It is sufficient for this purpose to bring the contents of the autoclave to a temperature of about 10 to 20° C. The mixing device is preferably operated during this period. The mono olefine evolved passes off from the autoclave through pipe 20, controlled by valve 21, and are compressed by means of pump diagrammatically indicated by 22, and thereafter cooled and condensed in coil 24 which discharges through pipe 25, controlled by valve 26 into tank 18. When all, or substantially all, of the mono olefine material has been removed from autoclave 1 the valve 21 is closed and the valve 30 is opened.

The contents of autoclave 1 are then heated, for example, by passing hot water or steam into the jacket 5 until a temperature of about 60° C. is attained. This causes the cuprous chloride butadiene compound to dissociate with evolution of butadiene which passes off through pipe 31, and is compressed by means of pump diagrammatically indicated by 32 to be cooled and condensed in coil 33, discharging through pipe 34, controlled by valve 35 into tank 36. The butadiene which is recovered by this process is a highly valuable material and may be converted into a variety of useful products. The butadiene may, for example, be conducted through pipe 40, controlled by valve 41, into the autoclave 42. Autoclave 42 is preferably provided with mixing device comprising propeller 43, rotated by shaft 44, driven through bevel gear 45 by suitable means not shown. The autoclave 42 is provided with a jacket 46 through which heating or cooling means may be introduced by means of pipes 47 and 48. The butadiene may, for example, be digested in autoclave 42 with sodium, potassium, sodium potassium alloys or acetic acid, etc.; to be controllably polymerized under suitable conditions of temperature and pressure, thereby forming a rubber like material.

A similar result may be obtained by starting in autoclave 1 with a fraction consisting predominantly of hydrocarbons of 5 carbon atoms to the molecule and containing mono and diolefines or with a hydrocarbon fraction containing olefines of both 4 and 5 carbon atoms to the molecule, and containing mono and diolefines of both 4 and 5 carbon atoms to the molecule. In this case, the diolefine fraction generated and passed into tank 36 is also suited to polymerization to form a rubber like material and/or to other valuable realizations. In my preferred practice, however, the olefine fraction treated in autoclave 1 contains both mono and diolefines which are preponderantly of the same number of carbon atoms to the molecule.

The mono olefine material stored in tank 18 may now be selectively treated for the manufacture of alkyl sulphates, and, if desired, for the generation of alcohol from said alkyl sulphates. The mono olefine material can be made to react much more easily and smoothly than the original hydrocarbon fraction, the reaction can be much more rapidly carried out, and the yield of alkyl sulphates therefrom is very substantially greater than obtainable by reaction on the original olefine fraction. This treatment is preferably divided into two stages, and for this purpose the autoclave 50 is preferably charged through pipe 51, controlled by valve 52, with aqueous sulphuric acid of from 60 to 70%, $H_2SO_4$ content, a concentration of about 63% being preferred. Autoclave 50 is similarly provided with mixing device comprising propeller 54, rotated by shaft 55, driven through bevel gear 56 by suitable means not shown. The autoclave 50 is provided with a jacket 57 through which cooling and/or heating means may be introduced by means of pipes 58 and 59. After charging autoclave 50 with sulphuric acid as described, a batch of the mono olefine hydrocarbon material is introduced through pipe 60, controlled by valve 61.

It will, of course, be understood that the relative quantities of olefine material and sulphuric acid is particularly adapted to the selective removal from the olefine material of isobutene, the acid should be stoicheometrically sufficient to react with the isobutene present, a slight excess say 10 to 20% of $H_2SO_4$ being preferred. The materials are then suitably mixed in autoclave 50 by operation of a mixing device and care is taken during this period to maintain the temperature of the reacting materials relatively low, say between 60 and 70° F. After the period of agitation, the mixing device is stopped and the materials in autoclave 50 permitted to stratify. The lower phase consists principally of tertiary butyl sulphates and may be withdrawn through pipe 70, controlled by valve 71 and diverted from the system through pipe 72, controlled by valve 73 for conversion into tertiary butyl alcohol and/or other useful products. The observation box diagrammatically indicated by 74 renders it possible to ascertain when all of this material has been withdrawn.

The material remaining in autoclave 50 at this point consists almost entirely of secondary butenes and may be subjected to appropriate treatment for the production therefrom of useful products. One such application consists in the manufacture therefrom of secondary butyl alcohol. The purified material may be converted into mono butyl sulphate by reaction with sulphuric acid, and the alkyl sulphate so produced may be directly utilized or converted into other products such as, for example, alcohols, esters, acetates, etc.

In one method of converting this secondary butyl sulphate, the butene is discharged through pipe 80, controlled by valve 81 into the autoclave 82. This autoclave is provided with a mixing device comprising propeller 83, rotated by shaft 82 which is driven through bevel gear 85 by suitable means not shown. When the butene has been charged to autoclave 82, sulphuric acid, preferably of from 70 to 75% $H_2SO_4$ content, is introduced through pipe 90, controlled by valve 91. The acid is preferably introduced at a relatively slow rate and the mixing apparatus is maintained in operation during this period. The temperature should be controlled and is preferably maintained between 70 and 80° F. although higher temperatures are permissible without substantial impairment of yield owing to the relative purity of the material treated. This temperature regulation is accomplished by introducing a cooling medium through pipe 92 to the jacket 93. The cooling medium returns through pipe 94. Such cooling medium may, for example, consist of liquid sulphur dioxid or ammonia. The amount of acid introduced should, of course, be sufficient to sulphate the butene present with the formation of mono butyl sulphate. At the conclusion of the operation the mono butyl sulphate formed may be withdrawn through pipe 100, controlled by valve 101, for utilization.

The foregoing specific description covers only a particular mode of carrying my invention into effect. Various other methods are available within the purview of my disclosure, and it is my intention that the invention be limited only by the following claims or their equivalents in which I have endeavored to claim broadly all inherent novelty.

I claim:

1. Process of segregating diolefines from a mixture containing the same with olefines, comprising contacting the mixture in liquid phase with finely divided solid cuprous chloride dispersed in an aqueous solution.

2. Process according to claim 1 in which the cuprous chloride is associated with a chloride of an amine.

3. Method of recovering diolefines from mixtures of the same with mono olefines, comprising treating the mixture with a slurry of finely divided solid cuprous chloride in an aqueous solution at a temperature not substantially above 10° C., withdrawing the unreacted mono olefines, and separating the diolefines from their compound with cuprous chloride.

4. Method according to claim 3 in which the residual mono olefines retained by the reaction mixture are expelled by mild heating.

5. Method of recovering butadiene from mixtures of the same with mono olefines, comprising treating the mixture with a solution containing finely divided solid cuprous chloride at a temperature not substantially above 10° C., withdrawing the unreacted mono olefines, heating to a temperature not substantially above 20° C. to expel the retained mono olefines, and heating to a temperature not substantially above 60° C. for expelling the butadiene and recovering the same.

6. Process of treating olefines in a mixture of hydrocarbons containing mono- and diolefines, which comprises separating a fraction, the olefine content of which consists predominantly of mono- and diolefines of the same number of carbon atoms to the molecule, selectively removing diolefines from said fraction by combining with solid finely divided cuprous chloride in an aqueous medium, and recovering the removed diolefines.

7. Process of treating olefines in a mixture of hydrocarbons containing mono- and diolefines, which comprises separating a fraction, the olefine content of which consists predominantly of mono- and diolefines of the same number of carbon atoms to the molecule, selectively removing diolefines from said fraction while in liquid phase by combining with solid finely divided cuprous chloride in an aqueous solution containing a chloride of an amine, and recovering the removed diolefines.

8. Process of treating olefines in a mixture of hydrocarbons containing mono- and diolefines, which comprises separating a fraction, the olefine content of which consists predominantly of butadiene and butene, selectively removing butadiene from said fraction by causing the butadiene to react with solid finely divided cuprous chloride in an aqueous medium, and recovering the butadiene removed.

9. Process of treating olefines in a mixture of hydrocarbons containing mono- and diolefines, which comprises separating a fraction, the olefine content of which consists predominantly of butadiene and butene, selectively removing butadiene from said fraction while in liquid phase by causing the butadiene to react with solid finely divided cuprous chloride in an aqueous solution containing a chloride of an amine, and recovering the butadiene removed.

10. Process of treating olefines in a mixture of hydrocarbons consisting predominantly of olefines including mono- and diolefines, which comprises separating a fraction consisting predominantly of mono- and diolefines of the same number of carbon atoms to the molecule, selectively removing diolefines from said fraction by reaction with solid finely divided cuprous chloride in an aqueous solution, and recovering the diolefines removed.

11. Process of treating olefines in a mixture of hydrocarbons consisting predominantly of olefines including mono- and diolefines, which comprises separating a fraction consisting predominantly of mono- and diolefines of the same number of carbon atoms to the molecule, selectively removing diolefines from said fraction while in liquid phase by reaction with solid finely divided cuprous chloride in an aqueous solution containing a chloride of an amine, and recovering the diolefines removed.

12. Process of treating olefines in a mixture of hydrocarbons consisting predominantly of olefines including butadiene and butene, which comprises separating a fraction consisting predominantly of butadiene and butene, separating butadiene from said fraction by reaction with solid finely divided cuprous chloride in an aqueous solution, and recovering the separated butadiene.

13. Process of treating olefines in a mixture of hydrocarbons consisting predominantly of olefines including butadiene and butene, which comprises separating a fraction consisting predominantly of butadiene and butene, separating butadiene from said fraction while in liquid phase by reaction with solid finely divided cuprous chloride in an aqueous solution containing a chloride of an amine, and recovering the separated butadiene.

14. Process of treating olefines in a mixture of hydrocarbons containing mono- and diolefines, which comprises separating a fraction, the olefine content of which consists predominantly of mono- and diolefines of the same number of carbon atoms to the molecule, contacting said fraction with solid finely divided cuprous chloride in an aqueous solution adapted for forming a compound with said diolefines and separable from said mono olefines, separating the compound so formed, and thereafter regenerating diolefines by dissociating the said compound.

15. Process of treating olefines in a mixture of hydrocarbons containing mono- and diolefines including butadiene and butene, which comprises separating a fraction, the olefine content of which consists predominantly of butadiene and butene, contacting said fraction with solid finely divided cuprous chloride in an aqueous solution adapted for forming a compound with said butadiene and separable from said butene, separating the said compound from said butene, and thereafter regenerating butadiene by dissociating said compound.

16. Process of treating olefines in a mixture of hydrocarbons consisting predominantly of olefines, mono- and diolefines, which comprises separating a fraction consisting predominantly of mono- and diolefines of the same number of carbon atoms to the molecule, contacting said fraction with solid finely divided cuprous chloride in an aqueous solution containing a chloride of an amine adapted for forming a compound with said diolefines and separable from said mono olefines, separating said compound, and thereafter regenerating diolefines by dissociating said compound.

17. Process of treating olefines in a mixture of hydrocarbons consisting predominantly of olefines including butadiene and butene, which comprises separating a fraction consisting predominantly of butadiene and butene, contacting said fraction with solid finely divided cuprous chloride in an aqueous solution adapted for forming a compound with said butadiene separable from said butene, and regenerating butadiene by dissociating said compound.

18. Process of treating olefines in a mixture of hydrocarbons containing mono- and diolefines, which comprises separating a fraction, the olefine content of which consists predominantly of mono- and diolefines of the same number of carbon atoms to the molecule, contacting said fraction with a slurry of solid finely divided cuprous chloride in an aqueous solution containing a chloride of an amine, thereby forming a compound of diolefines with cuprous chloride insoluble in said mono olefines, and thereafter regenerating diolefines by warming said compound.

19. Process of treating olefines in a mixture of hydrocarbons containing mono- and diolefines, which comprises separating a fraction, the olefine content of which consists predominantly of mono- and diolefines of the same number of carbon atoms to the molecule, contacting said fraction in liquid phase with a slurry of solid finely divided cuprous chloride in an aqueous solution containing a chloride of an amine, thereby forming a compound of diolefines with cuprous chloride insoluble in said mono olefines, and thereafter regenerating diolefines by warming said compound.

20. Process of treating olefines in a mixture of hydrocarbons containing mono- and diolefines, butadiene and butene, which comprises separating a fraction, the olefine content of which consists predominantly of butadiene and butene, contacting said fraction in liquid phase with a slurry of solid finely divided cuprous chloride in an aqueous solution containing a chloride of an amine thereby forming a compound of said butadiene with said cuprous chloride which is insoluble in said butene, separating said compound from said butene, and thereafter regenerating butadiene by warming said compound.

21. Process of treating olefines in a mixture of hydrocarbons consisting predominantly of olefines including mono- and diolefines, which comprises separating a fraction consisting predominantly of mono- and diolefines of the same number of carbon atoms to the molecule, contacting said fraction with a slurry of solid finely divided cuprous chloride in an aqueous solution containing a chloride of an amine, thereby forming a compound of said diolefines with said cuprous chloride and insoluble in said mono olefines, separating said compound from said mono olefines, and thereafter regenerating diolefines by warming said compound.

22. Process of treating olefines in a mixture of hydrocarbons consisting predominantly of olefines including butadiene and butene, which comprises separating a fraction consisting predominantly of butadiene and butene, contacting said fraction with a slurry of solid finely divided cuprous chloride in an aqueous solution containing a chloride of an amine, thereby forming a compound of said cuprous chloride with said butadiene and insoluble in said butene, separating said compound from said butene, and thereafter regenerating butadiene by dissociating said compound.

23. Process of making a rubber-like material, which comprises separating a fraction from a mixture of hydrocarbons, containing mono- and diolefines, the olefine content of which fraction consists predominantly of mono- and diolefines of four to five carbon atoms to the molecule, contacting said fraction with finely divided solid cuprous chloride dispersed in an aqueous solution and adapted for forming a compound with said diolefines and separable from said mono olefines, thereafter regenerating diolefines by dissociating said compound, collecting the regenerated diolefines and polymerizing the same, thereby forming a rubber-like material.

24. Process of making a rubber-like material, which comprises separating a fraction from a mixture of hydrocarbons consisting predominantly of olefines including mono- and diolefines, which fraction consists predominantly of mono- and diolefines of four to five carbon atoms to the molecule, contacting said fraction with finely divided solid cuprous chloride dispersed in an aqueous solution and adapted for forming a compound with said diolefines and separable from said mono olefines, separating said compound from said mono olefines, thereafter regenerating diolefines by dissociating said compound, collecting the regenerated diolefines and polymerizing the same to form a rubber-like material.

BENJAMIN T. BROOKS.